(12) United States Patent
Del Sordo et al.

(10) Patent No.: US 11,659,229 B2
(45) Date of Patent: May 23, 2023

(54) SYSTEM AND METHOD FOR MANAGEMENT AND PRESENTATION OF ALTERNATE MEDIA

(71) Applicant: ARRIS ENTERPRISES LLC, Suwanee, GA (US)

(72) Inventors: Christopher S. Del Sordo, Souderton, PA (US); Albert Fitzgerald Elcock, West Chester, PA (US); Charles R. Hardt, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/237,459

(22) Filed: Apr. 22, 2021

(65) Prior Publication Data

US 2021/0344990 A1 Nov. 4, 2021

Related U.S. Application Data

(60) Provisional application No. 63/017,272, filed on Apr. 29, 2020.

(51) Int. Cl.
*H04N 21/431* (2011.01)
*H04N 21/433* (2011.01)
*H04N 21/435* (2011.01)
*H04N 21/43* (2011.01)

(52) U.S. Cl.
CPC ....... *H04N 21/4316* (2013.01); *H04N 21/433* (2013.01); *H04N 21/435* (2013.01); *H04N 21/43072* (2020.08)

(58) Field of Classification Search
CPC ............. H04N 21/478; H04N 21/4622; H04N 21/485; H04N 21/4821; H04N 21/4756

USPC ....................................... 725/14, 37, 59, 106
See application file for complete search history.

(56) References Cited

U.S. PATENT DOCUMENTS

| 2012/0289147 A1* | 11/2012 | Raleigh | H04N 21/6547 455/3.06 |
| 2013/0110978 A1* | 5/2013 | Gordon | H04N 21/4627 709/218 |
| 2014/0195675 A1 | 7/2014 | Silver | |
| 2017/0332125 A1 | 11/2017 | Panchaksharaiah et al. | |

(Continued)

OTHER PUBLICATIONS

International Search Report and Written Opinion for Application No. PCT/US2021/028697 dated Jul. 21, 2021.

*Primary Examiner* — Jivka A Rabovianski
(74) *Attorney, Agent, or Firm* — Panitch Schwarze Belisario & Nadel LLC

(57) ABSTRACT

A system and method for the automatic management of the presentation of information from two or more media sources. This automatic management includes the selective viewing of video information on a prescribed screen, screen window or screen configuration, as well as the selective provision of audio information to a particular port or appliance. This management is performed in response to and a s a function of consumer preferences, as well as the source, type and content of the video and audio information. The management system may be entirely located within the consumer's residence, or reside in whole or in part in a connected network or cloud. The system can initiate video/audio management in an entirely autonomous manner, or initiate only in response to user input (keypad, graphical user interface, voice, etc.).

22 Claims, 4 Drawing Sheets

400

Media Providers/Accounts

| User ID | Cable/Optical Provider | Internet Provider | Internet Media Account A ID/Password | Internet Media Account B ID/Password | Social Media Account ID/Password | e-mail Address/ Password | Video Conference Service D/Password |
|---|---|---|---|---|---|---|---|
| Andrew | Provider 112 | Provider 116a | ID AAAA | ID WWWW | @Andrew | Andrew@xxx.com /1234 | Andy22/ Rosebud |
| Beth | Provider 112 | Provider 116b | ID BBBB | ID XXXX | @Beth | Beth@xxx.com/ 5678 | |
| Charles | Provider 112 | Provider 116b | ID CCCC | ID YYYY | @Charles | Charles@xxx.com/ 9181 | |
| Donna | Provider 112 | Provider 116b | ID DDDD | ID ZZZZ | | | |

(56) References Cited

U.S. PATENT DOCUMENTS

2020/0089469 A1 3/2020 Wilberding et al.
2020/0194004 A1* 6/2020 Bates .................... H04L 67/125

* cited by examiner

Stored Media 200

| User ID | Image Files | Video Files | Voice Message Files | Music Files |
|---|---|---|---|---|
| Andrew | Andrew's Vacation Photos | Band Gigs | Work Messages | Classical Mix |
| | Andrew's Band Photos | Curling | Personal Messages | Road Trip Playlist |
| | | | Messages from Beth | |
| Beth | Beth's Hawaii Trip | Beth's Birthday Party | Voice Messages | Ramones |
| | Beth's Yellowstone Trip | | | Patti Smith |
| Charles | Charles' School Photos | Onward | Voice Messages | Party Mix |
| Donna | | Sesame Street | | Sesame Street Playlist |
| None | Hawaii Trip Photos | 1986 World Series | Voice Messages | Jazz |
| | Yellowstone Photos | Game of Thrones | | Rock |
| | Family Photos | School Play | | Kid's Songs |
| | | The Wizard of Oz | | Classical |

FIG. 2

Media Delivery Vectors

| User ID | Primary Video Display | Secondary Video Display | Bluetooth® Headset | Mobile Device |
|---|---|---|---|---|
| Andrew | DTV 108a | Laptop 114 | 124a | 122a |
| Beth | DTV 108a | DTV 108b | | 122b |
| Charles | DTV 108a | | 124b | |
| Donna | DTV 108a | DTV108b | | |

Media Providers/Accounts

| User ID | Cable/Optical Provider | Internet Provider | Internet Media Account A ID/Password | Internet Media Account B ID/Password | Social Media Account ID/Password | e-mail Address/ Password | Video Conference Service ID/Password |
|---|---|---|---|---|---|---|---|
| Andrew | Provider 112 | Provider 116a | ID AAAA | ID WWWW | @Andrew | Andrew@xxx.com /1234 | Andy22/ Rosebud |
| Beth | Provider 112 | Provider 116b | ID BBBB | ID XXXX | @Beth | Beth@xxx.com/ 5678 | |
| Charles | Provider 112 | Provider 116b | ID CCCC | ID YYYY | @Charles | Charles@xxx.com/ 9101 | |
| Donna | Provider 112 | Provider 116b | ID DDDD | ID ZZZZ | | | |

SYSTEM AND METHOD FOR MANAGEMENT AND PRESENTATION OF ALTERNATE MEDIA

CROSS-REFERENCE TO RELATED APPLICATION

This application claims the benefit of U.S. Provisional Patent Application No. 63/017,272, filed Apr. 29, 2020, which is incorporated by reference herein in its entirety.

BACKGROUND OF THE INVENTION

The availability of an ever-increasing number and type of video and visual media sources, the increasing size and definition of digital televisions ("DTVs"), and the almost ubiquitous availability of residential high-speed bidirectional data/video communication are combining to change the consumer media viewing experience. In particular, it has become more feasible than ever for consumers to simultaneously access multiple media presentations. Audio and video can be sourced from cable, optical fiber, smartphones, tablets, security devices, video doorbells, computers and digital assistants. Video can be streamed to one or more large format displays (such as DTVs or video monitors), as well as smaller format displays (tablets, smartphones, etc.). Audio can be streamed to headsets and smart speakers. For example, it is not uncommon for a consumer to be able to have independent audio streaming from a media controller to Bluetooth®-enabled headsets, while a different audio and/or video presentation is sent by that controller to an HDMI port. Consumers are also able to view multiple video windows on DTVs using picture-in-picture ("PIP") technology, split-screen or mosaic video presentation formats. All these allow for more than one media presentation to be rendered for simultaneous viewing.

The types of visual media available to consumers is also not limited to broadcast or video-on-demand services that are received at or streamed into a residence. Consumers have a wide variety of alternate video and audio sources available to them, including the aforementioned smartphones, tablets, security devices, video doorbells, computers and digital assistants. Consequently, when a consumer is viewing a presentation from a given video source, there may be a host of reasons why that consumer would want, or need to temporarily access an alternate media (audio and/or video) presentation. It would not be unusual for a consumer viewing broadcast content on in a primary window on a DTV, to temporarily want to view video from a video doorbell via a secondary PIP window upon the DTV, and temporarily stream only audio from the video doorbell to the headset of a the consumer viewing the DTV (while still rendering audio associated with the broadcast content via HDMI to the DTV). Once the consumer video doorbell interaction terminated (the individual(s) at the door either entered the or left the vicinity), the consumer would close the PIP window and switch back to the broadcast audio in their headphones.

It is also a common practice for consumers to switch between two media viewing experiences over a limited time period. For example, when a consumer is watching a given broadcast or streaming program and a commercial break occurs, they often switch to another channel or video source so as to watch something of interest and then switch back to the initial broadcast/streaming program at a time at which they estimate or guess the commercial break has terminated. This usually results in a consumer switching several times back and forth until the commercial is actually over.

There exists a need for system and method that provides a consumer with a convenient and automatic means of controlling automated rendering of multiple sources of video and audio streams and sources based upon the type of video and/or audio as well as predetermined consumer preferences, the disclosure of which is hereby incorporated herein by reference.

BRIEF SUMMARY OF THE INVENTION

A system and method for the automatic management of the presentation of information from two or more media sources. This automatic management includes the selective viewing of video information on a prescribed screen, screen window or screen configuration, as well as the selective provision of audio information to a particular port or appliance. This management is performed in response to and a s a function of consumer preferences, as well as the source, type and content of the video and audio information. The management system may be entirely located within the consumer's residence, or reside in whole or in part in a connected network or cloud. The system can initiate video/audio management in an entirely autonomous manner, or initiate only in response to user input (keypad, graphical user interface, voice, etc.).

BRIEF DESCRIPTION OF THE DRAWINGS

The aspects, and advantages of the present invention will become better understood with regard to the following description, appended claims, and accompanying drawings in which:

FIG. 2 provides a table representative of media stored in the system of FIG. 1.

FIG. 3 provides a table representative of available vectors within the system of FIG. 1.

FIG. 4 provides a table representative of user-specific provider and account information associated with the system of FIG. 1.

DETAILED DESCRIPTION

Figure 1:
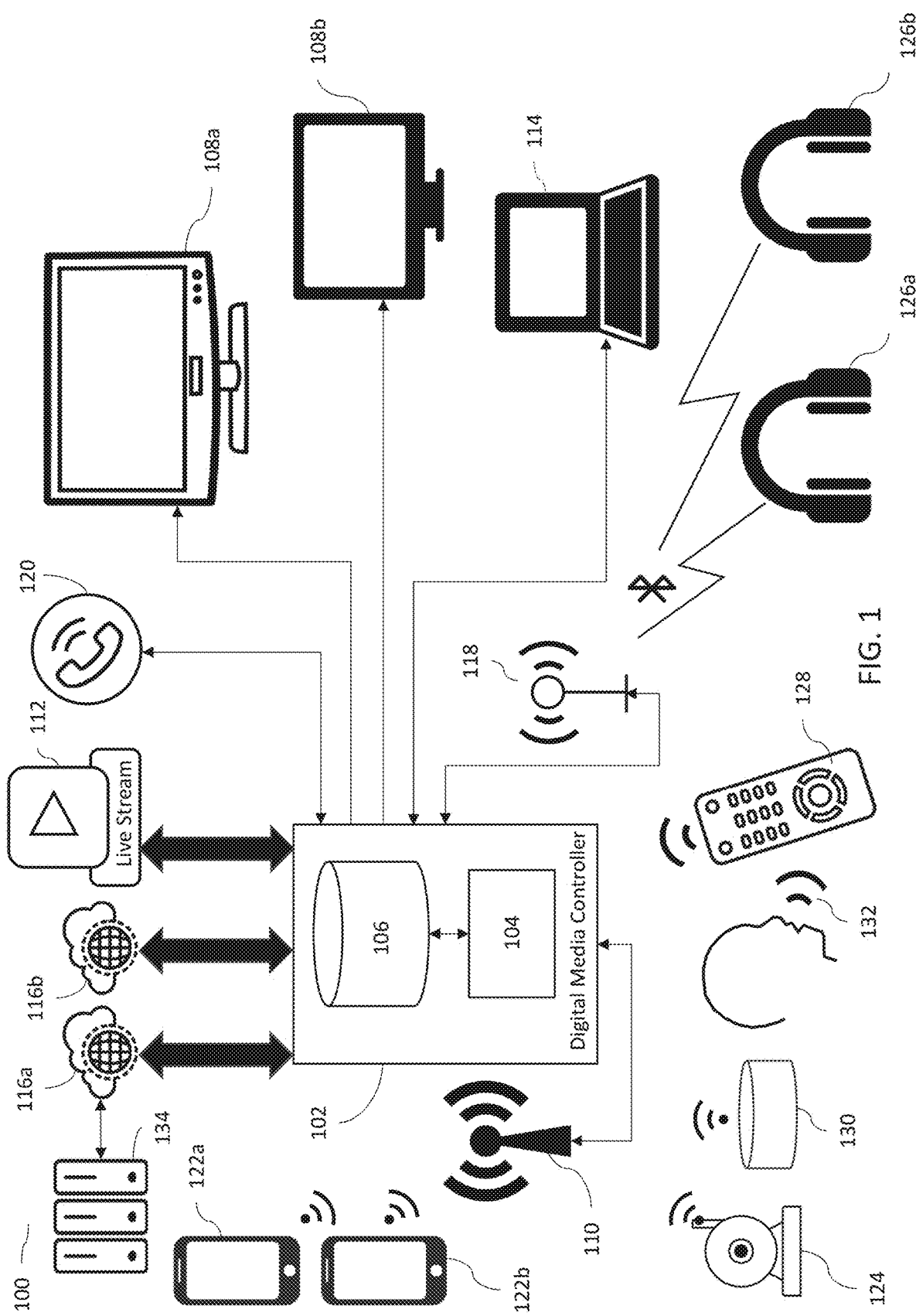
FIG. 1 is a functional diagram of a system supporting a first preferred embodiment of an alternate media management and presentation.

FIG. 1 provides a functional diagram of a system (100) for the management and presentation of alternate media. As shown, the system includes digital media controller 102 which serves as the nexus for the system. Digital media controller 102 includes processor 104 (which includes at least one digital processor), and memory 106. This digital media controller may be implemented via a general-purpose personal computer, a dedicated appliance (such as a set-top box or other consumer premises equipment), or via an off-site device connected to the wireless interface and other peripherals via private or public networks.

Digital media controller 102 is shown to be interfaced with digital televisions 108*a* and 108*b*, Wi-Fi interface 110, cable/optical media provider 112, laptop computer 114, Internet providers 116*a* and 116*b*, Bluetooth® transceiver 118 and telecom provider 120. In addition, mobile devices (smartphones) 122*a* and 122*b*, and security video camera (124) are adapted to interface with digital media controller 102 via a bidirectional Wi-Fi connection supported by Wi-Fi interface 110, and wireless headphones 126*a* and 126*b* interface with digital media controller 102 via Bluetooth transceiver 118. Remote control 128 is shown to be communicatively linked to digital media controller 102 via a wireless connection. This wireless connection can be optical (infrared) or radio frequency ("RF"). If the digital media controller is located off-site it will be understood that a network connection to an optical or RF transceiver could be utilized to relay remote control commands to the off-site digital media controller.

Processor 104 serves to control and direct incoming and outgoing media to and from digital media controller 102, including video, image and audio information stored in memory 106. In addition, processor 104 is responsive to user-specific information stored in memory 106, as well as user commands received by digital media controller 102. Such commands may be issued by users via laptop computer 114, mobile devices 122a and 122b, remote control 128, or digital assistant 130. As shown, remote control 128 includes a keypad that may be actuated by a user to generate a command, or a user may issue a voice command (132) which the remote-control forwards to digital media controller 102 for voice recognition and processing. This received voice command can also be forwarded by processor 104, via media controller 102 and Internet provider 116a, to an off-site server (134) for recognition and processing. A voice command could also be received and forwarded in a similar manner by digital assistant 130. Memory 106 is capable of storing digital video and audio which may viewed or listened to via the various peripherals (108a, 108b, 114, 122a, 122b, 126a, 126b) interfaced with digital media controller 102.

As mentioned above, memory 106 stores video, image and audio information. The video stored information can consist of recorded programs received via cable/optical media provider 112, or Internet providers 116a and 116b (memory 106 functioning as a DVR), downloaded video and images from computers, mobile devices, residential video cameras, etc., as well as downloaded music files. A user can also identify or tag these stored files within memory 106 so as to designate a particular name, genre, event, or an association with a particular user. Processor 104 is adapted to receive and process user commands for such tagging via the graphical user interface ("GUI") provided by laptop computer 114, or mobile devices 122a and 122b, as well as via remote control 128.

For example, as shown in table 200 of FIG. 2, there are four identified users (Andrew, Beth, Charles and Donna). Particular photo, video, voice message and music files are associated with each of these users. A video file labeled "Band Gigs" is shown to be associated with the user named Andrew, as is a music file labeled "Classical Mix". To make such an association, a user could have utilized a GUI to a) enter the name "Andrew" in a field associated with the video and music files at issue, or b) used a mouse, stylus or touch-screen associated with the GUI to designate the files as associated with Andrew. A user (via remote control 128, digital assistant 130, or mobile devices 122a and 122b) may also tag files using a set of voice commands that system 100 is adapted to recognize and respond to. For, example, a user could recite a command such as "Associate the music file Ramones with Beth" or "The image file Charles' School Photos belongs to Charles".

Memory 106 is also adapted to store information identifying the various peripherals within system 100 that are available as vectors for the presentation of streaming, live or stored media, as well as any association between particular users and those peripherals. For example, DTV 108a is designated as the primary video display for all users. Laptop computer 114 has been designated as Andrew's secondary video display and headset 126a as his Bluetooth headset. DTV 108b is designated as the secondary video display for users Beth and Donna. Information associating an additional headset (126b) as well as two mobile devices (122a and 122b) is also stored in memory 106 (as shown in Table 300). Bluetooth pairing of devices with the system is done in the normal manner via user interface such as that provided by laptop computer 114, DTVs 108a and 108b, or mobile devices (smartphones) 122a and 122b. The association between various Bluetooth peripherals and users can be made using GUIs or voice commands in a manner similar to that described with respect to tagging media files.

In addition, memory 106 also stores information that associates various media providers and account information with users. Such stored information is represented in Table 400 of FIG. 4. As shown, when applicable, the various users are associated with a cable/optical media provider, an Internet provider, a social media account, a video conferencing account, as well as streaming media accounts. Memory 106 also stores any required passwords associated with the providers and accounts, so as to enable system 100 to gain access.

The ability of the system to associate provider, account and password information with a user permits the execution of pre-configured routines that enable users to easily access personal media from a host of sources. For example, the command "Show Andrew's Internet Media Account A Holiday Photos". As evidenced by Table There is nothing stored in memory 106 that has been indexed or labeled as "Holiday Photos" associated with Andrew. Rather as the command stated, these particular photos are associated with Andrew's Internet Media Account A. Rather, information would be stored in Memory 106 so as to pre-configure the systems response when the "Andrew's Internet Media Account A" was recognized. This pre-configuration routine, entered and stored by a user via a GUI, would instruct the system to access and retrieve the requisite ID and password from memory 106, and utilize Internet Provider 116a to access the requested photos (memory 106 contains information associating this provider with Andrew—see table 400).

The voice command responsiveness of the system is enabled by processor 104 and media controller 102 function to recognize, process and execute a predetermined set of commands based upon user input and the information stored in memory 106. These commands can be entered by a user via GUI or as voice commands. Examples of syntax for such commands are shown below:

Show [sporting event] with commercials on [user name]'s mobile device.
Show [broadcast program] and [user name]'s [stored image files].
Show [user name]'s [social media account] and [Internet media].
Show [sporting event] and [security camera] and commercials.
Show [stored video file] on [user name]'s mobile device and route audio to [user name]' headphones.
Show [event] on all displays.
Show [social event] on all displays.
Play [user name]'s [music file] on [user name]'s headphones.
Play [music file] on [peripheral].
Play [video file] on [peripheral].
Switch to [user image file] for [interval].
Switch to [music file].
Switch to [alternate provider or media] during commercials.

Switch to [sporting event] during commercials.
Switch to [user name]'s text messages during commercials.
Switch to [user name]'s video conference call with [name].
Switch to [stored image files] from [start time] to [end time].
Switch to [user name]'s primary display.
Also show [event] with audio routed to [user name]'s headphones for the next [interval].
Also show Eagles Game on [vector].
Also show [device].

The syntax has the basic format of "action" (show, play, switch, also), "content" (video, image, account, Internet) and "vector" (primary/secondary display, headphones, mobile device). The initiating words of the command phrases ("Show", "Play", "Switch", "Also") serve to instruct system 100 as to base action being requested.

"Show" is indicative of the rendering of visual content; For example, the command "Show the Eagles Game on Beth's TV" would instruct the system to route a video stream of that sporting event to the DTV identified in the system as Beth's primary video display. Whereas the command "Show the Eagles Game" would instruct the system to route a video stream of that sporting event to whatever display was active, as no particular vector was specified.

"Play" is indicative of audio content. For example, the command "Play the Eagles game on Andrew's Headphones" would cause system 100 to play the audio portion of the video stream of that sporting event on the headphones associated with Andrew in memory 106.

"Switch" indicates that the command is requesting a change in content or vector. For example, "Switch to the Eagles game during commercials" would instruct system 100 to show the video stream of that sporting event whenever a commercial break occurred in the program that was presently being displayed. The command "Switch to Andrew's mobile device" would instruct system 100 to cease showing/playing content on presently active vector and show/play that content on Andrew's mobile device.

As shown above, the syntax also permits user names to be employed as modifiers within the commands. A user name can modify content ("Show Charles' video; Play Beth's voice messages") or a vector (Beth's mobile device).

Time constraints, either specific (start time, stop time, fixed interval), or tied to a particular condition ("during commercials") are also permitted within the syntax.

The conjunctions "also" and "with" serve to permit a user to command that more than a single content be simultaneously presented on a given vector. For example, in response to the command "Also show Eagles Game on DTV 108a" processor 104 can be pre-programmed to respond by causing media controller 102 to display the video stream of that sporting event in a picture-in-picture ("PIP") window overlaid upon whatever content was already being displayed on DTV 108a. Whereas processor 104 can be pre-programmed to respond to the command "Show Eagles game and security camera on Andrews mobile device" by instructing media controller 102 to display, upon Andrew's mobile device, the video stream of that sporting event on a split-screen side-by-side with a live feed from the security camera.

The above commands and syntax can be utilized to create tailored media experiences that can incorporate broadcast video, live streaming video, as well as stored media. For example, a user could recite the following commands:

"Show the Eagles game on DTV 108a and switch to Andrew's Vacation Photos during commercials."

"Also show live feed from Andrew's social media account"

The first command would result in the system routing a live feed of the Eagles game, sourced from cable/optical media provider 112, to DTV 108a and switching to a slideshow of the images stored in the file "Andrew's Vacation Photo's"—sourced from memory 106, when a commercial breaks occurs during that sporting event. The second command would cause the system to open a PIP window within the display of the Eagles game on DTV 108a, and display the video stream currently associated with Andrew's social media account therein. All of the requisite information and connectivity to establish this live feed is available to the system. As shown in FIG. 1, digital media controller interfaces with Internet provider 116b and Table 400 of FIG. 4 indicates that memory 106 contains information associating provider 116b with Andrew. In addition, table 400 shows that memory 106 also contains information indicates that social media account "@Andrew" is also associated with Andrew and provides the required password ("1112") for accessing that account.

Although the invention herein has been described with reference to particular embodiments, it is to be understood that these embodiments are merely illustrative of the principles and applications of the present invention. For example, in addition to the various interfaces specifically mentioned in as providing GUIs in the above described system (laptop computer, smartphone), a dedicated appliance, a personal computer or a tablet could also serve this function. Similarly, although DTVs, a laptop computers and smartphones were described as vectors for displaying or playing media, any type of visual or audio device capable of reasonably reproducing the particular type of media being accessed by a user would be a suitable vector (tablet, analog TV, projector, audio system, etc.). In addition, the particular syntax of the voice commands disclosed above is not intended to be limiting. Technology supporting the recognition of and response to such commands is well-known in the art and continually advancing—It will be understood that the principles of the disclosed embodiments can be applied to this advancing technology without departing from the scope of the invention.

The invention claimed is:

1. A media management system comprising:
at least one vector adapted to present a primary digital content;
a controller, comprising at least one processor and at least one memory, wherein:
the memory stores information identifying:
a plurality of digital content suitable for presentation via the at least one vector;
an identifier associated with the at least one vector;
user-specific preference information indicative of digital content and vector preferences;
user-specific password information;
user-specific identification information, and
a syntax for interpreting user commands; wherein the at least one processor is adapted to:
receive from the at least one user a representation of a command conforming to the stored syntax, wherein the command is indicative of at least one of the plurality of digital content; and
identify, based, at least in part, upon the received user command and the information stored in the memory, at least one of the plurality of digital content to be presented and the vector for said presentation;

wherein the at least one processor is adapted to:
execute at least one pre-configured routine to retrieve from the memory user-specific information, comprising at least a user-specific password, required to access the identified at least one of the plurality of digital content to be presented;
utilize the retrieved user-specific information to access the identified at least one of a plurality of digital content to be presented; and
present the at least one identified digital content upon the identified vector, based, at least in part, upon the primary digital content.

2. The system of claim 1 wherein the received command is a voice command.

3. The system of claim 1 wherein the at least one memory is further adapted to store user identification information, and wherein the identifying of the least one of the plurality of digital content is based, at least in part, upon the stored user identification information.

4. The system of claim 1 wherein the user preference information comprises at least one of the following:
content provider information;
internet provider information;
social media account information;
video conference account information; and
mobile device information.

5. The system of claim 1 further comprising a graphical user input adapted for the entry of the command conforming to the stored syntax.

6. The system of claim 1 wherein at least one of the primary digital content and the at least one identified digital content is comprised of both video content and audio content and, wherein, based upon based upon the stored syntax and the received command, the audio content is not presented via the same vector as the video content.

7. The system of claim 1 wherein, based upon the stored syntax and the received command, the at least one identified digital content is presented via the at least one vector concurrently with the primary digital content.

8. The system of claim 7 wherein the at least one identified digital content is presented via the vector as a picture-in-picture window overlaid upon the primary digital content.

9. The system of claim 7 wherein the at least one identified digital content is presented via the vector on a split-screen with primary digital content.

10. The system of claim 1 wherein the at least one memory is further adapted to store video and audio content.

11. The system of claim 10 wherein the primary digital content and the at one identified digital content are each comprised of at least one of the following:
streaming video;
streaming audio;
live video;
stored digital images;
stored digital video; and
stored digital audio.

12. A method for managing a media system comprising:
at least one vector presenting a primary digital content;
a controller, comprising at least one processor and at least one memory, wherein the memory stores information identifying a plurality of digital content suitable for presentation via the at least one vector; an identifier associated with the at least one vector; user-specific preference information indicative of content and vector preferences; user-specific password information; user-specific identification information; and a syntax for interpreting user commands;
the method comprising the steps of:
receiving from at the least one user a representation of a command conforming to the stored syntax, wherein the command is indicative of at least one of the plurality of digital content;
identifying, based, at least in part, upon the received user command and the information stored in the memory, at least one of the plurality of digital content to be presented and the vector for said presentation;
executing at least one pre-configured routine to access user-specific information, comprising at least a user-specific password, required to access the identified at least one of the plurality of digital content to be presented;
utilizing the accessed user-specific information to access the identified at least one of a plurality of digital content to be presented; and
presenting, via the at least one processor, the at least one identified digital content upon the identified vector, based, at least in part, upon the primary digital content.

13. The method of claim 12 wherein the received command is a voice command.

14. The method of claim 12 wherein the at least one memory is further adapted to store user identification information and the step of identifying the least one identified digital content is based, at least in part, upon the stored user identification information.

15. The method of claim 12 wherein the at least one memory is further adapted to store user identification information and the at least one identified digital content is identified based, at least in part, upon the stored user identification information.

16. The method of claim 12 wherein the user preference information comprises at least one of the following:
content provider information;
internet provider information;
social media account information;
video conference account information; and
mobile device information.

17. The method of claim 12 wherein at least one of the primary digital content and the at least one identified content is comprised of both video content and audio content and, wherein, based upon based upon the stored syntax and the received command, the step of presenting comprises the audio content not being presented via the same vector as the video content.

18. The method of claim 12 wherein, based upon the stored syntax and the received command, the step of presenting the at least one identified digital content comprises presenting, via the at least one vector, the at least one identified content concurrently with the primary digital content.

19. The method of claim 18 wherein the at least one identified digital content is presented as a picture-in-picture window overlaid upon the primary digital content.

20. The method of claim 18 wherein the at least one identified digital content is presented via on a split-screen with primary digital content.

21. The method of claim 12 wherein the at least one memory is further adapted to store video and audio content.

22. The method of claim 21 wherein the primary digital content and the at least one identified digital content are each comprised of at least one of the following:

streaming video;
streaming audio;
live video;
stored digital images;
stored digital video; and
stored digital audio.

\* \* \* \* \*